(No Model.)

W. L. FITTS.
PIPE COUPLING.

No. 466,521. Patented Jan. 5, 1892.

Witnesses,
J. H. Rouse
J. A. Bayless.

Inventor,
William L. Fitts
By Dewey & Co.
Attys.

UNITED STATES PATENT OFFICE.

WILLIAM L. FITTS, OF SAN JOSÉ, CALIFORNIA.

PIPE-COUPLING.

SPECIFICATION forming part of Letters Patent No. 466,521, dated January 5, 1892.

Application filed June 18, 1891. Serial No. 396,764. (No model.)

*To all whom it may concern:*

Be it known that I, WILLIAM L. FITTS, a citizen of the United States, residing at San José, Santa Clara county, State of California, have invented an Improvement in Pipe-Couplings; and I hereby declare the following to be a full, clear, and exact description of the same.

My invention relates to an improved means for coupling pipes together.

It consists of two collars, into which the outwardly-turned and parallel flanges of the adjacent ends of the pipes to be coupled are fitted, guides by which these collars are brought together with a certain relation to each other, and a lever mechanism fulcrumed to one of the collars and acting against the other, whereby the two parts are drawn and locked together.

It also consists in a means for regulating the tension or pressure by which the parts are held together, and in certain details of construction.

Figure 1:
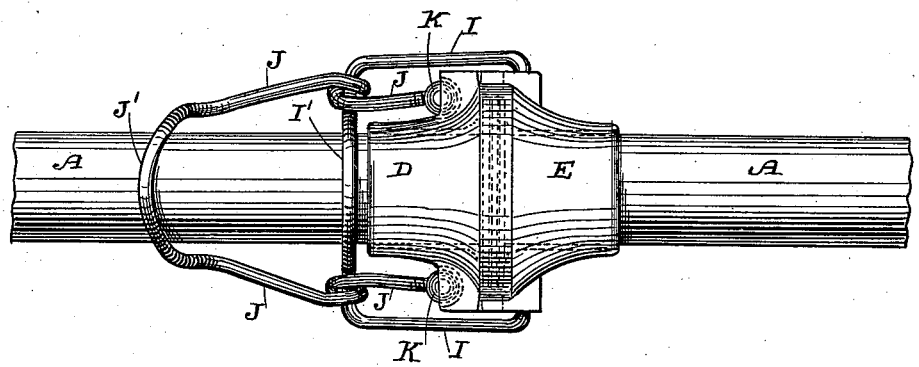
Figure 2:
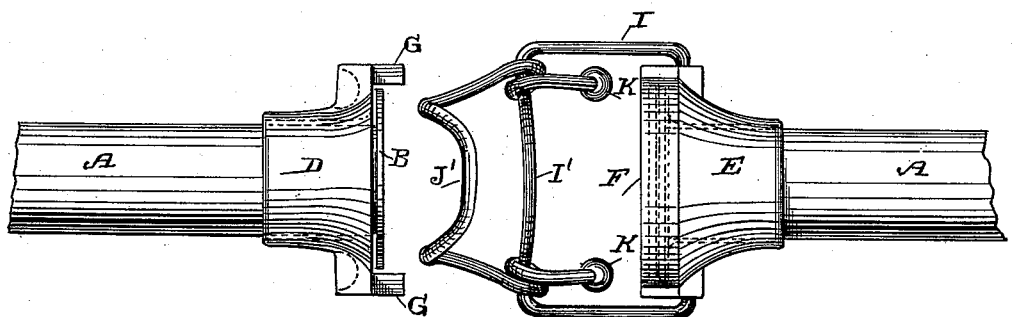
Figure 3:
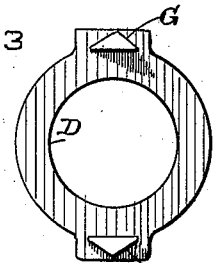
Figure 4:
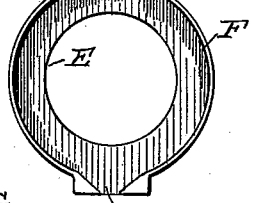
Figure 5:
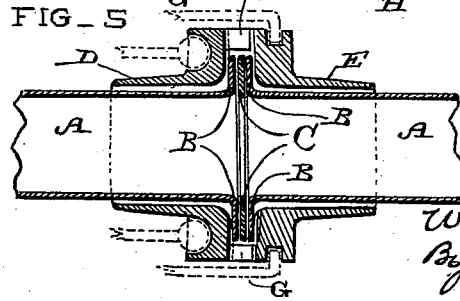

Referring to the accompanying drawings for a more complete explanation of my invention, Figure 1 is a view of the meeting ends of two pipes, showing my coupling in position and the pipes locked together. Fig. 2 shows the two parts separated. Fig. 3 is an end view of the sleeve D. Fig. 4 is an end view of the sleeve E. Fig. 5 is a longitudinal section of the pipes coupled.

A A are the two pipes which it is desired to couple together. Each of these pipes has a circular flange B formed upon the end, these flanges having faces of sufficient diameter and meeting together with a packing-ring C or any other suitable means for making a tight joint between them.

D and E are two sleeves or collars, one of which fits about each of the pipes A, and the flanges at the end of the pipes abut against the inner ends of these collars. One of these collars has a rim F, which projects a short distance and incloses the flange of its pipe and serves to retain the packing ring or washer in place. It also serves to guide the other collar, the periphery of which fits inside of this rim. Upon one of the collars are the projecting lugs or spurs G, and the other collar has corresponding openings H, into which these spurs enter when the two are brought together.

In the sides of the lugs which have the openings H made in them is hinged a stout link or yoke I, the two sides of which extend parallel with each other and have the uniting portion I' curved in the form of a semicircle, so as to clasp one side of the opposite pipe A when the sides I of the yoke stand parallel with the pipe and in the position which they occupy when the pipes are locked together. Upon this yoke is fulcrumed a second yoke J, having also a curve J', which allows it to fit around the side of the pipe when in position. These yokes are shown in the present case as being bent out of a sufficiently stiff wire, and the ends of the yoke J are bent to form one turn, which clasp the wires I, and thus form a fulcrum upon these wires. The ends of J extend beyond the fulcrum and may be rounded and fit directly into semi-globular sockets formed upon the backs of the lugs G, which thus serve as fulcrums about which the yokes J turn, and these yokes act upon the yokes I to draw them up, and thus lock the two pipes together.

In order to adjust the leverage and regulate the tension by which the parts are drawn together, I have made the length of the lever-arms variable. This may be done in various ways. In the present case the ends of the arms J are screw-threaded, and globular heads K are screwed upon them. These heads fit the sockets of G and may be moved to lengthen or shorten the levers at will. When the pipes are to be fixed together, the ends are brought together so that the spurs G enter the slots H of the opposite collar, thus guiding the two collars together, so that the pipes will stand in line with each other. The yokes are then both turned upward about the fulcrum-point of the yoke I, and the balls K, resting in the sockets provided for them, form a second fulcrum about which the yoke J moves, thus forcing the two ends of the pipe and the collars very firmly together. When the curved portion J' of the yoke fits against the pipe, the portion J will stand at a slight inclination beyond the fulcrum-point of the lever ends, and this holds the yoke against the pipe with sufficient force to prevent its becoming detached. When it is necessary to disengage the pipes for any purpose, it is only necessary to pull the yoke J backward, when it will draw with it the yoke I, and the two may be turned about the fulcrum-points of the yoke I, the balls being withdrawn from their fulcrum-points in the sockets of the lugs G, thus leaving the two ends of the pipe free to be separated without further labor. The balls being screwed upon the ends of the yoke J, it will be manifest that they may be adjusted by screwing them off or on, so as to be given as great a pressure as may be necessary to hold the pipes together.

This coupling may be applied to any pipes by making the parts sufficiently strong to resist any internal pressure or thrust, and it will be manifest that they are very easily separated for repairs or other purposes.

Having thus described my invention, what I claim as new, and desire to secure by Letters Patent, is—

1. In a pipe-coupling, the sleeves or collars encircling the meeting ends of the pipes and having the flat abutting surfaces, the pipes having flanges turned outwardly upon their ends to lie upon said surfaces, and means for making a tight joint between their meeting ends, in combination with a swinging yoke hinged to one of the collars upon opposite sides, a second yoke fulcrumed to the first one and having the spherical-shaped heads fitting in corresponding sockets upon the other collar, said sockets serving as fulcrum-points about which the second yoke is turned, whereby the ends of the pipes are drawn forcibly together and the yokes locked in position, substantially as herein described.

2. In a pipe-coupling, the pipes having flanges turned upon their ends so that the faces will abut together, collars surrounding each of the pipes and having corresponding abutting faces, upon which the flanges of the pipes rest, guiding spurs and sockets by which the abutting ends are brought together in line with each other, a yoke fulcrumed to one of the collars, so as to swing about its fulcrum-point, a second yoke fulcrumed to the first one with the ends fitting into receiving-sockets upon opposite sides of the second collar, and spherical heads fitted to the ends of the yoke with screw-threads or means whereby they may be adjusted, so that the yoke is lengthened or shortened by such adjustment, substantially as herein described.

In witness whereof I have hereunto set my hand.

WILLIAM L. FITTS.

Witnesses:
S. H. NOURSE,
J. A. BAYLESS.